United States Patent [19]

Wagner et al.

[11] 4,169,009
[45] Sep. 25, 1979

[54] LARGE AREA MICROSTRUCTURE PROCESSING

[75] Inventors: Robert A. Wagner, Manchester; Peter K. Cheo, West Hartford, both of Conn.

[73] Assignee: United Technologies Corporation, Hartford, Conn.

[21] Appl. No.: 782,867

[22] Filed: Mar. 30, 1977

[51] Int. Cl.² .......................................... H01L 21/306
[52] U.S. Cl. ..................... 156/636; 29/580; 156/643; 156/662; 357/17
[58] Field of Search ............ 350/96.12; 219/121 LM; 156/643, 151, 64, 153, 154, 626, 636, 662, 643, 629, 645; 204/192; 29/580, 583; 357/17–19; 51/281 R, 317, 318, 326, 309 A

[56] References Cited

U.S. PATENT DOCUMENTS

| | | | |
|---|---|---|---|
| 3,342,652 | 9/1967 | Reisman et al. | 156/636 |
| 3,548,189 | 12/1970 | Meinel et al. | 156/643 |
| 3,586,547 | 6/1971 | Glendinning | 156/643 |
| 3,629,023 | 12/1971 | Strehlow | 156/636 |
| 3,976,511 | 8/1976 | Johnson | 156/643 |

OTHER PUBLICATIONS

Government Report Entitled: Infrared Waveguide Modulators at Microwave Frequencies, Semi-Annual Technical Report for the Period: Mar. 25, 1975 to Sep. 25, 1975, Section 2.0 and 3.0; High Power IR Waveguide Modulators and Microwave Characteristics of IR Waveguide Modulators, respectively.

Primary Examiner—William A. Powell
Attorney, Agent, or Firm—Dominic J. Chiantera

[57] ABSTRACT

A plurality of different monolithic, three-dimensional thin-film infared waveguide structures having high optical power handling capability, low optical propagating loss, long propagation and interaction length and distortion-free characteristics are fabricated through high precision mechanical, chemo-mechanical, and ion-beam thinning of a bulk crystal wafer.

7 Claims, 13 Drawing Figures

LARGE AREA MICROSTRUCTURE PROCESSING

The Government has rights in this invention pursuant to Contract No. N00014-73-C-0087 awarded by the Office of Naval Research, U.S. Department of the Navy.

CROSS-REFERENCE TO RELATED APPLICATION

The subject matter hereof is also disclosed, and some of it is claimed in one, or both of the following commonly owned, copending U.S. patent applications entitled MONOLITHIC, THREE-DIMENSIONAL INFRARED WAVEGUIDE FOR HIGH POWER LASERS, U.S. Ser. No. 782,857, now U.S. Pat. No. 4,124,270, and BROADBAND MICROWAVE WAVEGUIDE MODULATOR FOR INFRARED LASERS, U.S. Pat. No. 782,866, now abandoned, each filed on even date herewith by P. K. Cheo et al.

BACKGROUND OF THE INVENTION

1. FIeld of Invention

This invention relates to fabrication of optical waveguide structures, and more particularly to fabrication of monolithic thin-film optical waveguides having a highly uniform thin-film thickness suitable for use with electrooptic and acousto-optic processing of high power infrared (IR) lasers.

2. Description of the Prior Art p The use of infrared (IR) lasers in both electrooptic and acousto-optic applications in applied optical systems such as optical imaging radars, high-data-rate communication systems, and high resolution spectroscopy systems is well known in the art. The desirability of using optical waveguides for generating intelligence derives both from the enormous inherent bandwidth of optical devices, and from the many specialized features of optical waveguides. These optical waveguide devices can be made smaller, cheaper, and more reliable than their conventional counterparts. They ar less susceptible to information degradation from electromagnetic interference, vibration, temperature changes, and cross talk; and for specific defense applications, they offer the important advantages of electrical isolation and increased communications security. Such applications require laser signal processing, such as amplitude, frequency and phase modulation to encode intelligence information on the carrier, or deflection and switching of the laser carrier to provide discrete optical control functions. The signal processing of the laser is provided during guided mode propagation of the laser through optical waveguides comprised of a high resistivity, high index of refraction crystal material which is either eptiaxially grown to a desired dimensional thickness, or fabricated through mechanical thinning and polishing of a larger ingot crystal to the desired dimension. Such epitaxially grown, or mechanically fabricated optical waveguides have been provided for use with infrared lasers only at very low optical power levels. For broadband signal processing the laser input power and/or the electrical driving power of the processing signal source must be increased. With increasing power levels, the prior art optical waveguide devices suffer performance degradation from a variety of waveguide imperfections. Some of the imperfections are pervasive to the waveguide material medium itself, such as free carrier absorption, dislocation, and lattice mismatch. Other imperfections are associated with the waveguide fabrication, such as processed induced damage resulting in minute fracture or surface imperfections of the crystal structure, and the lack of thickness uniformity throughout the surface area of the waveguide. Still further imperfections are associated with waveguide design, such as electric power loss at high frequencies resulting from improper electrooptic interface, surface deformation of the waveguide by electrode mounting, and stress-induced birefringence caused by a discontinuity in the index of refraction of the waveguide medium along the boundaries of the electrode resulting in optical distortion.

Epitaxially grown waveguide structures are limited in useful applications since only one major surface of the grown waveguide structure is available for electrode deposition, as shown in the use of epitaxially grown optical waveguides in laser switching and deflection applications as disclosed in U.S. Pat. No. 3,904,270, entitled INTEGRATED OPTICAL SIGNAL PROCESSING SYSTEM, issued to P. K. Cheo on Sept. 9, 1975. In addition, the generic substrate material on which the waveguide medium is grown has the same basic crystalline structure and a closely related index of refraction as that of the grown layer, resulting in undesirable leakage of the guided optical wave into the substrate. The mechanically thinned waveguide structures known in the prior art provide very low optical transmission and are limited to very small size and propagation path length due to the prior art methods of fabricating the thin-film waveguides from bulk crystal ingots. The known prior art devices are limited to only the planar configuration due to inadequate thickness control, and thickness uniformity throughout the surface area of the waveguides.

SUMMARY OF THE INVENTION

An object of the present invention is to provide a process for fabricating thin-film membranes having an accurately controlled thickness and a thickness uniformity over a large area. Another object of the present invention is to provide a process for fabrication of three-dimensional infrared waveguides which are suitable for use with high power laser applications. Still another object of the present invention is to provide a process for fabrication of thin-film optical waveguides suitable for use in broadband microwave waveguide modulators.

According to the present invention a saw-cut wafer of the desired membrane material having two mutually opposed major surfaces is successively thinned on each of the two surfaces through successive steps of lapping, chemo-mechanical polishing and ion-beam milling while maintaining parallelism between the two major surfaces. In further accord with the present invention, the chemo-mechanical polishing and ion-beam milling remove a determined amount of wafer material on each side of the product membrane, the determined amount being selected in dependence on the desirable characteristics of each step. In still further accord with the present invention, the thickness is monitored during the process to ensure thickness uniformity throughout the wafer area during each processing step. In still further accord with the present invention, a thin-film, three-dimensional infrared waveguide is fabricated from a product thin-film membrane by a further process of photolithic masking of a selected one of the major surfaces of the thin-film membrane to provide a waveguide three-dimensional pattern, the three-dimensional pattern being provided by ion-beam milling the developed photolithic pattern. In still further accord with the present invention, a thin-film optical waveguide for use in a broadband microwave waveguide modulator is fabricated from a three-dimensional thin-film waveguide through the further steps of electroplating modulation electrodes in a determined region of each of the two major surfaces of the waveguide.

The fabrication process of the present invention provides high accuracy control of the thin-film wafer thickness together with a uniform thickness dimension throughout a large area of the saw-cut wafer. In the fabrication of the three-dimensional waveguides, the high degree of thickness uniformity throughout the guided laser propagation path allows for distortion-less transmission of the laser through the waveguide and a significant reduction in optical propagation loss through the guide. Other objects, features and advantages of the present invention will become more apparent in the light of the following detailed description of the preferred embodiment thereof, as illustrated in the accompanying drawing.

DESCRIPTION OF THE PREFERRED EMBODIMENT

Figure 1:
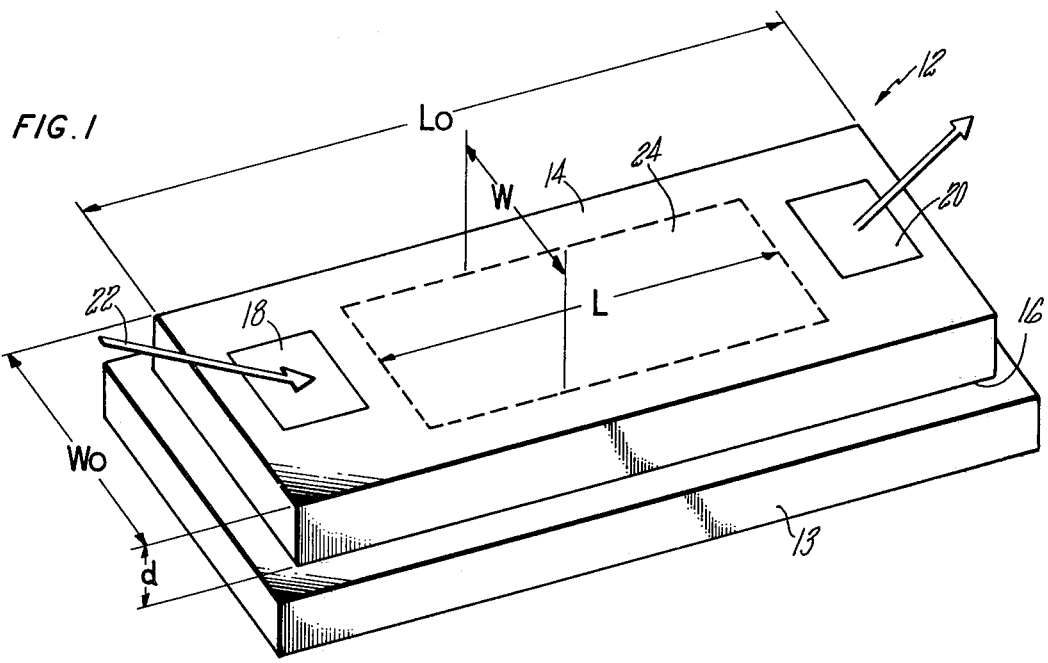
FIG. 1 is a perspective illustration of a planar optical waveguide provided through a fabrication process according to the present invention.

Referring now to FIG. 1, one embodiment of a thin-film optical waveguide according to the present invention, includes a monolithic, planar thin-film structure of a crystal material having high infrared (IR) transmission characteristics, high resistivity, and a high index of refraction profile, such as Gallium Arsenide (GaAs), Cadmium Telluride (CdTe), Zinc Selenide (ZnSe), or any other similar suitable material. The monolithic thin-film is in the form of a large size rectangular slab having a determined width ($W_o$) and length ($L_o$), and a determined thickness (d). The waveguide may be bonded through a process, disclosed in the second one of the two hereinbefore cross referenced, copending applications, to a metallic base 13, such as copper which provides conduction of the combined optical and electrical power dissipated within the guide, in addition to providing mechanical support of the structure. The waveguide 12 has two mutually opposed major surfaces, an upper surface 14 and a lower surface 16. The upper surface 14 includes optical coupling regions 18, 20 located at opposite ends of the upper major surface 14, which illustrate the location of the optical couplers used to provide coupling of a laser beam 22 into the waveguide. The optical couplers used may be any one of a number of optical coupling techniques known in the art, such as optical gratings, or prism couplers, however, prism couplers are preferred due to the higher coupling efficiency of the prism coupler which is on the order of ten times that of the grating coupler. This large difference in coupling efficiency provided by the prism coupler results from the lower coupling strength of the grating coupler and the partition of the IR beam energy into multiple diffracted beams when the grating coupler is used, as opposed to a single, substantially homogeneous waveguide beam provided by the prism couplers. The preferred prism couplers may be right angle, germanium prisms of a type known in the art, having prism geometry selected to provide laser excitation of the lower order $TE_0$ and $TE_1$ propagation modes within the waveguide.

An interaction region 24 having a width W and a length L is located in the central portion of the waveguide 12 between the coupling regions 18, 20. The interaction region represents the portion of the waveguide 12 which is common to both the guided laser 22 propagating through the waveguide and the processing signal source, such as the microwave electrodes of the broadband microwave waveguide modulator disclosed in the cross-referenced copending application, or the switching electrodes and interdigital electrodes for electro-optic and acousto-optic processing described in my hereinbefore referenced U.S. Patent.

Figure 2:
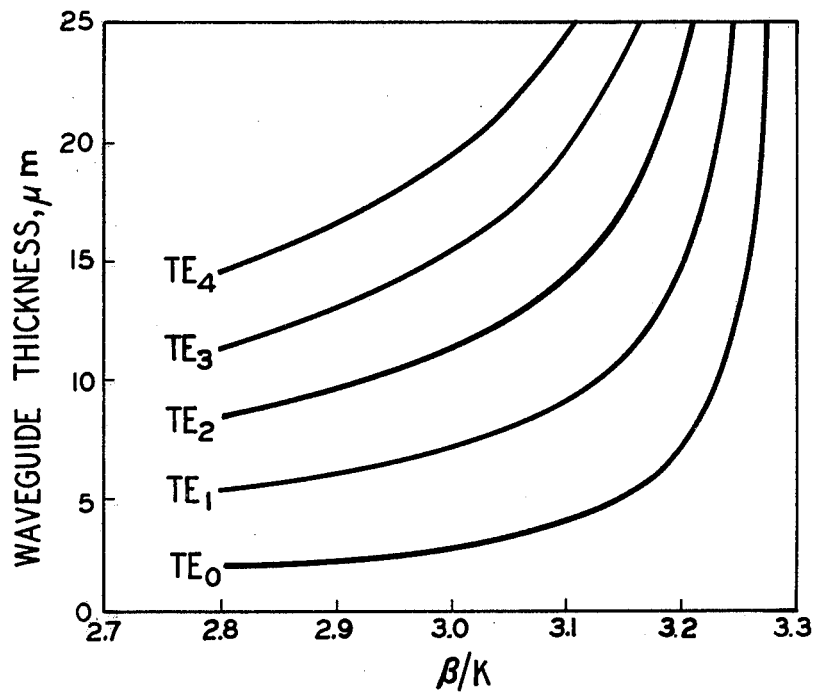
FIG. 2 is an illustration of an operating characteristic of thin-film optical waveguides.

The thin-film waveguide thickness (d) in the interaction region is typically on the order of two to three times the wavelength of the operating laser, and for a 10.6 micron, $CO_2$ laser, the typical thickness is on the order of 25 microns. The thickness (d) must be large enough to limit the optical losses in the waveguide which increase with decreasing thickness, and yet be small enough to limit laser beam guided propagation to a single mode operation within the interaction region 24. Thickness uniformity is maintained to within one micron per square centimeter between any portion of the major surfaces 14, 16, and throughout the entire surface area, defined by the width $W_o$ and length $L_o$. The thin film waveguide 12 has a higher refractive index N than its surrounding media. In FIG. 1 the media surrounding the waveguide is air with a refractive index of unity, and the refractive index of the base 13 is $N_b$. The waveguide structure can support a number of discrete TE optical wave propagation modes, each with a corresponding propagation phase constant $\beta$ falling within a range of values: $\kappa < \beta < \kappa N$, where $\kappa = (2\pi/\lambda)$. FIG. 2 is a plot of the waveguide thickness (d) versus the modal index $\beta/\kappa$ for the various TE modes of a GaAs thin-film waveguide having a refractive index $N=3.275$ at the 10.6 micron wavelength of an IR $CO_2$ laser. With the placement of metal electrodes on the surface of the guide the phase constant $\beta$ is not altered to a significant extent, however, the optical attenuation coefficient of the waveguide medium is altered. As described in an article entitled *Optical Waveguide Structures for $CO_2$ Lasers*, by P. K. Cheo et al Applied Optics, Vol. 12, pg. 500, March 1973, a metal cladded thin-film waveguide at a thickness (d) of 25 microns has an attenuation coefficient of 0.055 $cm^{-1}$ and 0.22 $cm^{-1}$ for the $TE_0$ and $TE_1$ modes respectively. At a thickness $d=15$ microns, the attenuation co-efficients increases to 0.25 $cm^{-1}$ and 1.0 $cm^{-1}$ for both modes. Therefore, use of long waveguide devices with thicknesses (d) much below 25 microns leads to appreciable optical and microwave propagation losses.

Figure 3:
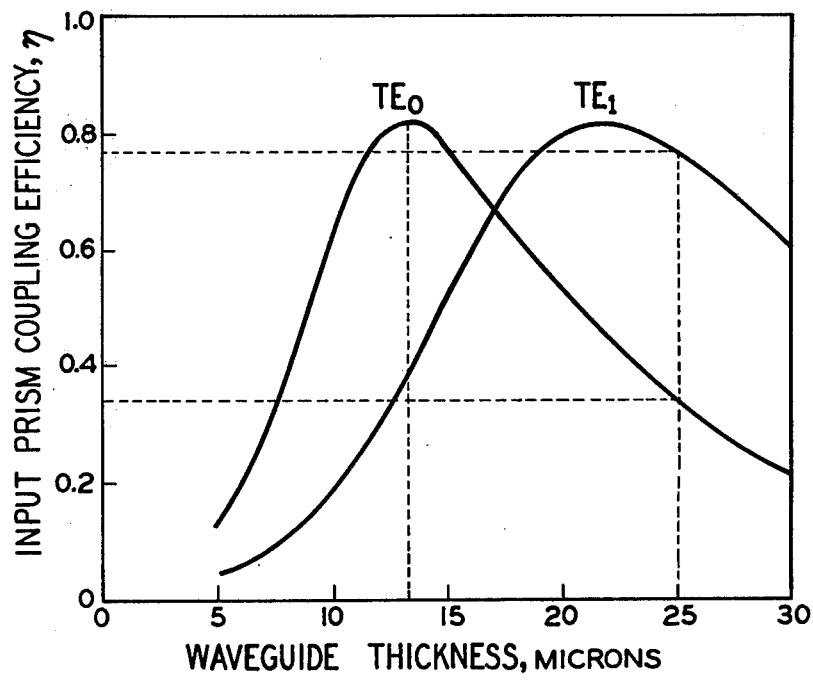
FIG. 3 is an illustration of another operating characteristic of a thin-film optical waveguide.

The prism coupling of the laser beam into the waveguide 12 depends critically on both phase and aperture matching of the laser beam with the corresponding TE mode. At a phase matched angle, the coupling efficiency $\eta$ for a uniform diameter input beam is given by the expression:

$$\eta = \frac{2}{\alpha l}(1 - e^{\alpha l})^2,$$

where l is the input beam diameter, and $\alpha$ is the coupling parameter which depends on the waveguide thickness, refractive index, and gap spacing between the prism base and the surface of the waveguide. The coupling efficiency for the $TE_0$ and $TE_1$ modes for a laser beam having a diameter $l=1$ millimeter, and a gap spacing of 0.1 micron between the prism base and the surface of the waveguide, is shown as a function of the waveguide thickness in FIG. 3. For waveguide thicknesses greater than 20 microns the most efficient coupling is obtained with the $TE_1$ or the higher order modes, whereas efficient coupling of the $TE_0$ modes requires a thickness less than 15 microns. Therefore, the planar waveguide 12 of FIG. 1 having a uniform thickness of 25 microns throughout the waveguide structure provides optical wave propagation in the $TE_1$ mode which has a larger input coupling efficiency than that of the low order $TE_0$ mode by a factor of two. Since the propagation loss of the higher order $TE_1$ mode is higher than that of the lowest order $TE_0$ guided wave mode, it is desirable to provide efficient excitation of the lower order $TE_0$ mode, which, as described hereinbefore, has a much lower optical attenuation coefficient. As shown in FIG. 3, efficient excitation of the $TE_0$ mode requires a waveguide thickness on the order of 12 to 15 microns in the coupling regions 18, 20. It is only at these thicknesses that maximum coupling efficiency for the $TE_0$ mode can be obtained.

Figure 4:
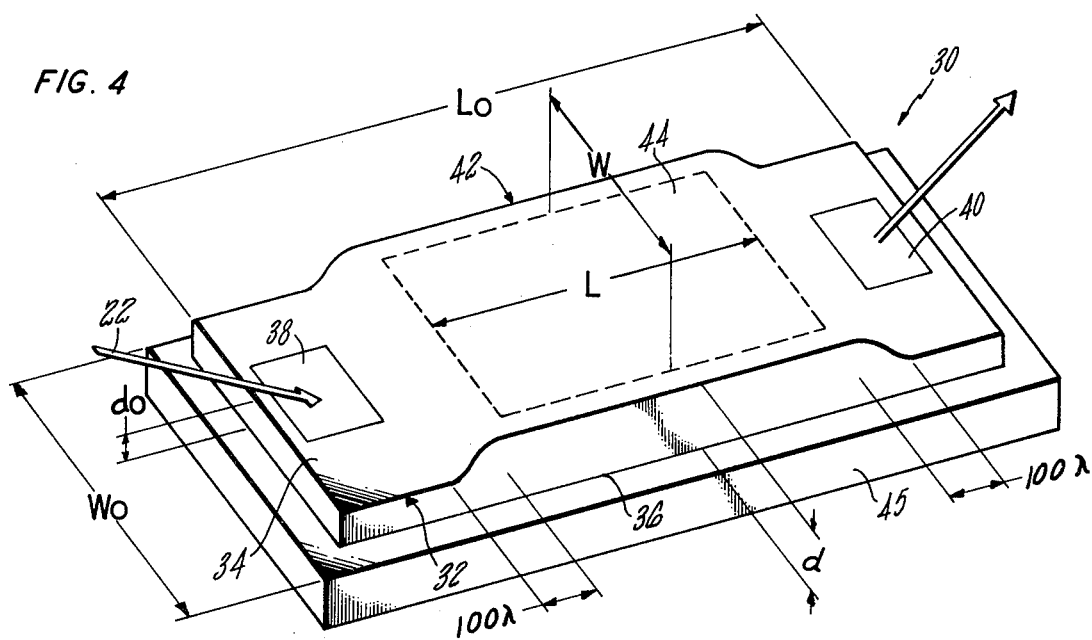
FIG. 4 is a perspective illustration of a three-dimensional infrared waveguide fabricated according to the present invention.

Referring now to FIG. 4, a bi-level, tapered, monolithic thin-film waveguide 30 provides a waveguide structure with a desired thickness of 25 microns in the interaction region, while providing a lower thickness value of on the order of 12 to 15 microns in the optical coupling regions. The waveguide 30 is comprised of the same crystal material as that of the planar waveguide 12 of FIG. 1, and includes a generally rectangular lower platform portion 32 having a width $W_o$ and a length $L_o$, and upper and lower major surfaces 34, 36. Optical coupling regions 38, 40 for mounting of the prism or grating couplers are disposed on the surface 34 at opposite ends of the platform portion 32. The lower platform 32 has a determined thickness ($d_o$) between the surfaces 34, 36 which is on the order of 12 to 15 microns, to provide efficient excitation of the lower order $TE_0$ propagation mode for the guided laser radiation. The monolithic waveguide further includes an upper platform portion 42 having a flat surface 44 which defines the height and boundary of the common interaction region of the waveguide, as having a length L and a width W. The upper platform portion 42 includes the interaction region of the waveguide, and has a typical thickness of 25 microns as measured from the flat surface 44 of the platform 42 to the lower major surface 36 of the platform 32. Each end of the upper platform is tapered to provide a smooth and gradual, piece-wise linear transition in thickness between the two portions of the waveguide. The piece-wise linear taper prevents any discontinuities which may cause mode conversion into higher order modes within the raised ridge interaction region, but does not preclude the excitation of the $TE_1$ and higher order modes which may be excited with selection of the proper angle of incidence at the surface of the right angle prism couplers. The taper length is on the order of 100 wavelengths (100λ) of the operating laser. As with the planar waveguide 12, the waveguide 30 may be bonded to a metal base 45, such as a copper block to provide heatsinking and increased structural strength to the waveguide.

The bi-level, tapered thin-film waveguide 30 provides enhanced optical transmission efficiency by providing efficient excitation of the lower order $TE_0$ mode to minimize optical propagation losses in the waveguide, while maintaining the desired 25 micron thickness in the common interaction region of the waveguide. Both the planar thin-film waveguide 12 and the bi-level thin-film waveguide 30 provide an interaction region with a width W which is sufficiently large to handle large laser beam diameters. The uniform thickness of the waveguide structure provides a distortion-less transmission of the laser through the waveguide. However, the placement of electrodes on the surface of the waveguide for use as an active signal processing device results in a surface deformation of the waveguide along the edges of the electrodes. This surface deformation results in a stress induced birefringence in the waveguide material along the edges of the electrodes which creates a nonlinear change in the index of refraction in that portion of the waveguide. So long as the electrodes are sufficiently wider than the diameter of the beam propagating through interaction region, such that the stress induced birefringence lies at a distance far enough from the propagating channel within the waveguide, no beam distortion will result. Similarly, if the electrodes are placed orthogonal to the beam propagation path, or are sufficiently small in length, the distortion of the beam due to the stress induced birefringence will be minimal. However, there are certain applications, such as the BROADBAND WAVEGUIDE MICROWAVE MODULATOR disclosed and claimed in the hereinbefore cross-referenced, copending application, in which the width of the microstrip electrode must be maintained at a small value (approximately one millimeter) to maintain the microwave characteristic impedance at a practical level. Since the narrow width microstrip closely approximates the diameter of the laser, distortion of the beam results. In addition, the use of such a narrow width microstrip electrode causes difficulty in alignment of the coupled-in laser beam with respect to the interaction region of both the planar thin-film, and bi-level, tapered thin-film waveguides. A slight misalignment of the beam with respect to the interaction region causes spreading and deflecting of the beam in the plane of the waveguide and produces significant distortion of the output laser beam shape.

Figure 5:
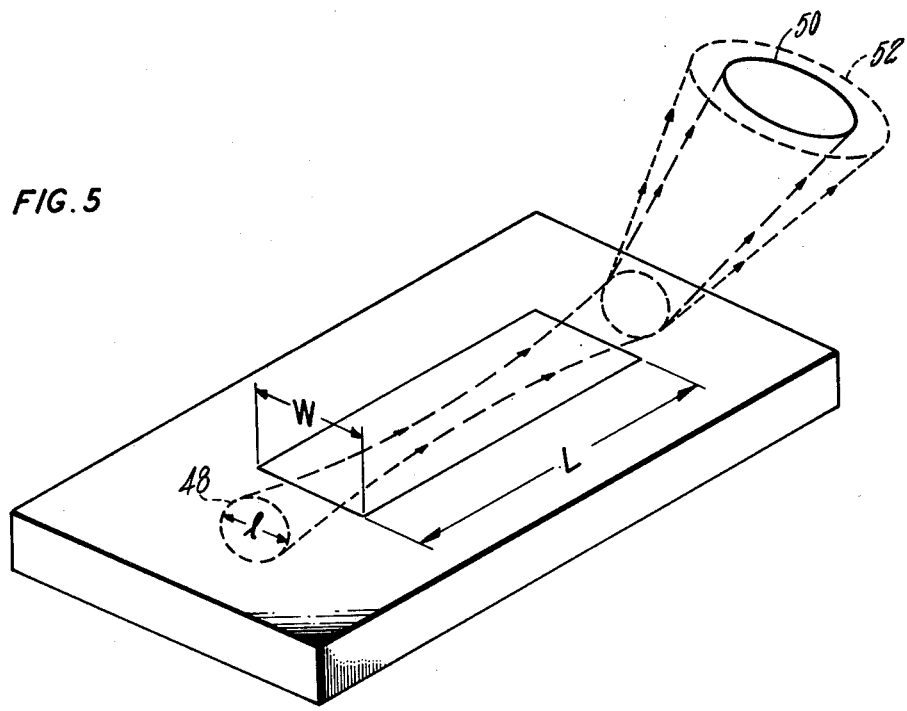
FIG. 5 is a perspective illustration of an operating characteristic of the waveguide embodiment of FIG. 1.

Referring to FIG. 5, in the absence of an electrode disposed on the surface of the interaction region which has a width W and a length L, an input gaussian shaped laser beam 48 having a beam diameter 1, approximately equal to the width W, propagates through the interaction region of the waveguide and is coupled out with a beam shape 50 in the far field which is nearly identical to that of the input beam. The transverse shape of the laser beam is essentially confocal through the length of the interaction region as shown. In this case the interaction length is limited in accordance with the confocal condition: $L \leq W^2(9N\pi/4\lambda)$. If an electrode is placed on the waveguide surface with dimensions equal to the width and length of the interaction region, the output beam is coupled at the same out-coupled angle, but is severely distorted from that of the input beam, as shown by the phantom waveform 52. The distortion is substantially elliptical and becomes nonsymmetrical if the beam is misaligned with respect to the interaction region beneath the electrode. This lens-like effect is caused by surface deformation of the waveguide along the edges of the electrode which produce the localized stress induced birefringence that is typically one order of magnitude larger than the microwave field induced birefringence. The elliptical distortion further increases with applied microwave power as a result of thermal induced birefringence. Since the electrode width cannot be increased to eliminate the beam distortion, a preferred approach is to remove a determined thickness ($d_c$) of the surface waveguide material which borders the edges of the electrode to provide a ridge, interaction region along the guided propagation path. Removal of the waveguide material eliminates the stress induced birefringence while at the same time permits nearly perfect alignment of the laser beam within the desired narrower width of the interaction region by providing collimation of laser within the ridge interaction region, thereby eliminating the confocal limitation on the length of the interaction region. The beam is confined within the ridge interaction region independent of the length L, and the output coupled laser beam shape is not degraded from that of the input beam shape. Such an optical waveguide which provides a ridge interaction region is referred to as a thin-film, simple channel, or ridge waveguide.

Figure 6:
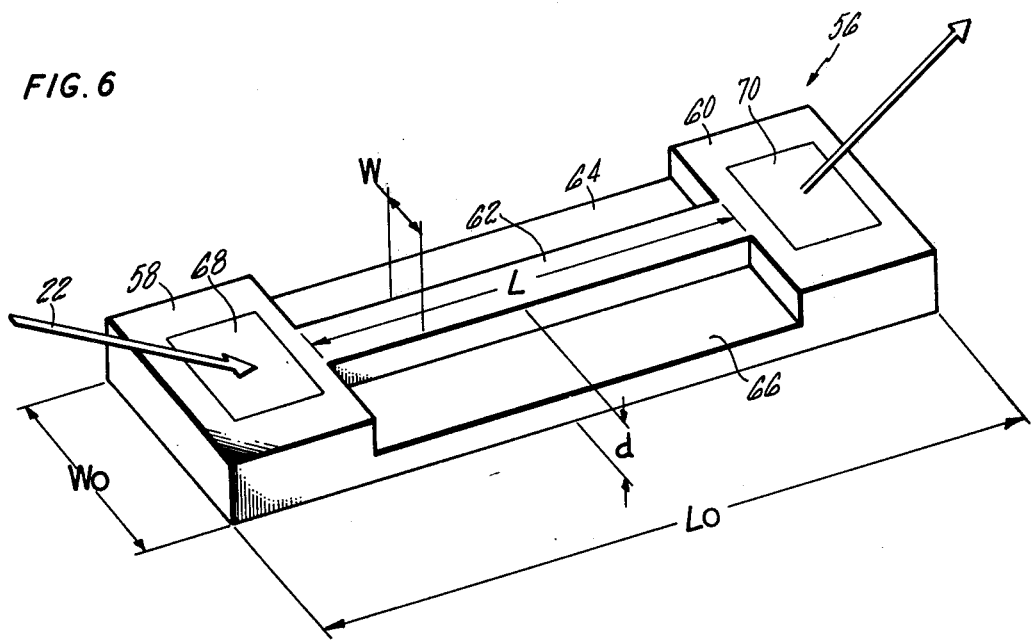
FIG. 6 is a perspective illustration of an alternative embodiment of a three-dimensional infrared waveguide fabricated according to the present invention.

Referring now to FIG. 6 a thin-film, ridge optical waveguide 56, comprises a thin-film material identical to that of the waveguides 12, 30 of FIGS. 1, 4 and includes a generally rectangular slab having a width $W_o$ and length $L_o$ essentially equal to that of the waveguides 12, 30. For $CO_2$ laser use, the waveguide 56 includes end portions 58, 60 having a thickness d on the order of 25 microns, which are interconnected along the longitudinal axis of the waveguide by a ridge interaction region 62. The interaction region 62 has the same thickness (d) as that of the end portions 58, 60, and having a width W and length L which is not limited by the confocal condition, as described hereinbefore. The edges of the interaction region 62 along the length L are bounded by channels 64, 66. A minimum channel depth ($d_c$) on the order of five microns, measured from the upper surface of the interaction region 62 to the bottom of the channel, is sufficient to provide a confinement of the laser beam within the narrower width W of the interaction region, and along any given length L, as well as to provide elimination of the stress induced birefringence produced by the placement of an electrode of equal width and length on the surface of the interaction region. The end portions 58, 60 include the optical coupling regions 68, 70 from which the laser beam 22 is coupled in and out of the waveguide. The thickness of the interaction region 62 is equal to that of the end portions 58, 60, typically 25 microns. Since the thickness of the waveguide material in the coupling region 68, 70 is equal to 25 microns, the optical couplers provide the highest efficiency coupling of the laser 22 for the higher order $TE_1$ mode, which as described hereinbefore is the higher loss optical mode.

The thin-film, ridge waveguide 56 is preferred for use in such applications as microwave modulation of infrared lasers as described in the cross-referenced, copending application. As such, the waveguide structure has electrodes deposited on both the upper and lower major surfaces of the waveguides as described therein, through integrated optic fabrication techniques described hereinafter in detail. The structure 56 of FIG. 6 does not include a base structure since the waveguide modulator application provides for the mounting of the waveguide together with the electrodes deposited thereon, on a copper block.

Figure 7:
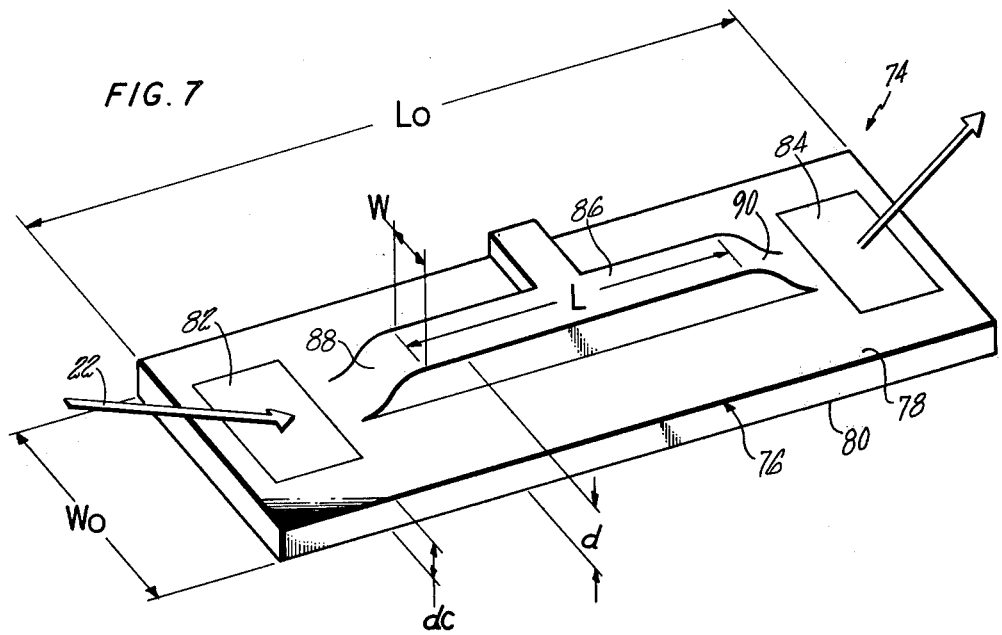
FIG. 7 is a perspective illustration of still another embodiment of a three-dimensional infrared waveguide fabricated according to the present invention.

A thin-film optical waveguide which provides the ridge interaction region similar to that provided by the waveguide 56, in addition to providing efficient excitation and propagation of the lower order $TE_0$ mode within the waveguide is illustrated in FIG. 7, where a thin-film, raised ridge waveguide 74 comprises a monolithic structure of crystalline material identical to that of the waveguide described hereinbefore, which has a planar base, or platform portion 76 of generally rectangular shape having a width $W_o$ and length $L_o$. The platform 76 has upper and lower major surfaces 78, 80 and coupling regions 82, 84 located at opposite ends of the platform along its length. A raised ridge portion 86 is disposed along the central longitudinal axis of the waveguide 74 on the upper major surface 78 of the platform 76. The raised ridge 86 includes the interaction region of the waveguide having a width W and length L substantially equal to that of the waveguide 56 of FIG. 6. The raised ridge 86 has tapers 88, 90 on each end of its length L which provide a piece-wise linear transition from a thickness d of the ridge 86 to a thickness $d_c$ equal to 12 to 15 microns for the platform portion 76. As described hereinbefore with respect to the three-dimensional thin-film waveguide 30 of FIG. 4, the narrow thickness of 12 to 15 microns in the optical coupling regions 82, 84 provide efficient excitation of the low order $TE_0$ mode and the piece-wise linear transition provided by the tapers 88, 90 prohibit power conversion into the higher order modes within the raised ridge interaction region 86. Similarly, as described hereinbefore, the higher order $TE_1$ mode may be excited with proper selection of the angle of incidence on the surface of the prism couplers used to couple in the laser 22.

In FIG. 7, the raised ridge 86 is shown in a form of a T configuration similar to that of the raised interaction region 62 of the waveguide 56. The T-shape of the raised ridge 86 is to provide for the accommodation of a T-shape microstrip electrode such as that used in the microwave modulator of the cross-referenced application to provide a standing wave microwave modulator configuration. The features of the raised ridge waveguide 74, including the raised ridge interaction region 86, the thin dimension thickness in the optical coupling regions 82, 84 which overall provide for the highest efficiency guided mode operation, may similarly be modified to accommodate a traveling wave modulator configuration, by adapting the raised ridge 86 to include perpendicular end feed portions as shown in FIG. 7 of the hereinbefore referenced, copending waveguide modulator application. The thin-film raised ridge waveguide 74 provides the most efficient optical waveguide for use with a phase modulator of the type described in the referenced copending modulator application, however, it is the most complex structure to fabricate. As with the waveguides 12, 30, 56 described hereinbefore the uniform thickness is maintained throughout the optical propagation path of the waveguide through a high precision fabrication process described in detail hereinafter.

The planar waveguide 12, and the three-dimensional waveguide 30 find the broadest use in the acousto-optical applications, although certain switching and deflection apparatus use may be applicable as described in my hereinbefore referenced U.S. patent. The simple channel waveguide 56, and the raised ridge waveguide 74 find specific utility in the electro-optical applications, specifically phase modulation of infrared lasers, where narrow electrode widths and long interaction lengths are required to provide high efficiency, broadband modulation of infrared lasers.

The waveguides described hereinbefore comprise thin film crystal material structures of a type known in the art such as $C_r$-doped gallium arsenide, cadmium teluride, zinc selenide, or any other such suitable material having the required properties. The fabrication of the waveguides involves controlled process techniques to ensure high accuracy dimensional control of the waveguide thickness (d) across the entire width and length of the optical wave propagating channel within the waveguide crystal structure. A process for fabricating the waveguides to the desired thin film thickness, with a thickness uniformity over the entire surface area of the waveguide on the order of one micron per square centimeter, is described in detail hereinafter. The process is equally applicable to fabrication of thin film membranes from any one of a number of thin film materials for any application, such as pressure sensing membranes for high accuracy pressure transducers, where precision thickness values and high thickness uniformity is required over a large area. The thin film material may include crystalline, amorphous (glass), semiconductor, and dielectric materials.

In the fabrication of the planar waveguide structures, the initial step is the selection of the desired electro-optic crystal. Generally, the selected crystal is commercially available in large size ingots which are sliced into thin saw cut wafers at the orientation [100] plane, to provide a plurality of rectangular saw cut wafers having a length and width large enough to provide one or more rectangular waveguides and a typical saw-cut thickness on the order of 0.015 inches (381 microns).

Figure 8:
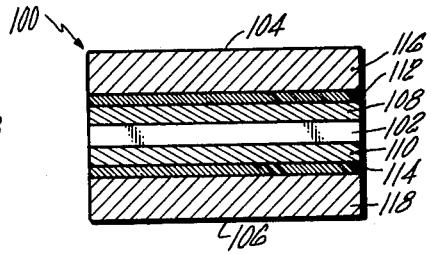
FIG. 8 is a simplified, sectioned side-elevation view of an exemplary material used in the fabrication of the optical waveguides of FIGS. 1, 4, 6, and 7.

As illustrated in FIG. 8, in a sectioned view along the orientation [100] plane of a saw-cut wafer 100, the wafer has two mutually opposed, parallel major surfaces 104, 106. Each of the major surfaces 104, 106 are subjected to the process, one surface at a time which as described in detail hereinafter includes the successive steps of lapping, chemo-mechanical polishing, and ion beam milling to remove successive layers of the saw-cut wafer material. Such that, for example, the surface 104 may first be processed by: first lapping the surface to remove a first dimension layer 116, next polishing the lapped finish of the surface 104 to remove a second dimension layer 112, and then ion beam milling the polished finish of the surface 104 to remove a third dimension layer 108. The major surface 106 is next processed in the same sequence of lapping, polishing, and ion beam milling to remove layers 118, 114, and 110 respectively. The processing of each major surface in this ordered sequence provides a resultant thin-film membrane 102, such as a planar waveguide structure, having a minimum amount of membrane surface distortion and a membrane dimension (thickness) between the major surfaces 104, 106 which is uniform to within one micron per square centimeter. The amounts of wafer material removed in the polishing and ion beam milling steps are generally fixed, whereas the amounts of material removed in the more coarse lapping process is dependent on: the initial thickness of the saw-cut wafer, the amount of material to be removed through ion beam milling and polishing, and the final, desired thickness of the thin-film membrane.

Therefore, following slicing of the ingots, each saw-cut wafer 100 is waxed on one of the major surfaces 104, 106 and placed waxed side down on a flat stainless steel block. The block is then fastened to the holding plate of a polishing jig which is used to provide both of the steps of lapping and polishing the saw-cut major surfaces, and which is a commercially available, precision polishing jig of the type developed by G. A. Bennett and R. B. Wilson, described in the article entitled *"Precision Polishing Technique for Optic and Microwave Acoustics"*, Journal of Scientific Instruments, Vol. 43, page 669, 1966. The precision jig includes a hollow, generally cylindrical, outer holder receiving a hardened steel sleeve having a central aperture of determined diameter concentric with the outer holder. A cylindrical holding plate of determined diameter is placed within the central aperture of the steel sleeve and mechanically mounted to the surface of a piston nested within the aperture of the steel sleeve, and movable within the sleeve. Three steel legs having hardened ends are connected to the outer holder. A conditioning ring, or collar, which is a standard option of the jig assembly, is attached to the outer holder. The upper surface of the holding plate may be aligned with the upper surface of the conditioning ring through adjustment of the piston. With the saw-cut wafer held to the stainless steel block through the waxed major surface, and the stainless steel block fastened to the holding plate of the polishing jig, the piston position is adjusted until the upper, exposed major surface of the saw cut wafer extends above the plane of the upper surface of the conditioning ring by an amount approximately equal to the material thickness to be removed in the lapping process. In this manner the plane of the upper surface of the conditioning ring provides a reference value for the lapping removal step.

During the initial lapping of the saw cut wafer, the parallelism between the two major surfaces 104, 106 of the saw cut wafer is the most crucial, and difficult parameter to control. Exact parallelism is necessary to ensure consistent dimensional thickness throughout the bulk of the crystal. Accurate measurements of the variation in crystal thickness over the surface area of the crystal is provided without physical contact of the wafer through the use of a Hover probe, of a type known in the art, such as the model 155-H manufactured by Ames-Mercer. The Hover probe, which has a noncontacting air gauge head is mounted through a steel shaft to an X-Y table having an angular tilt adjustment. The output signal from the noncontacting air gauge is read on an electronic volt meter, of a type known in the art, which has a dimensional scale readout, such as the Ames-Mercer Model 155-3 which provides a three micron full scale reading in 0.05 micron divisions. For the parallelism adjustment the precision polishing jig is suitably mounted on the X-Y table, and the saw cut wafer disposed on the holding plate of the jig is aligned in parallel with the three hardened steel legs of the polishing jig through the use of the Hover probe. The Hover probe is referenced to a zero center scale reading on the surface of the conditioning ring in the vicinity of one of the three hardened steel legs. Subsequently the other two steel leg locations are brought under the Hover probe and the corresponding micrometer head of the X-Y tilt cable is adjusted to provide a corresponding zero reference value at the location. After all three legs are made parallel, the Hover probe is then placed above the surface of the flat steel plate containing the saw cut wafer and mounted to the holding plate of the jig. The steel plate is adjusted through adjustment of the holding plate, which itself has three angular adjustments, until the block surface is parallel to the steel legs and the conditioning plate. After the parallelism adjustment of the saw cut wafer surface to the surface of the conditioning ring, the precision jig assembly with the wafer mounted thereon is removed from the X-Y table and placed in an eccentric lapping and polishing machine of a type known in the art, such as the model MAZUR 602 manufactured by Geoscience Corp.

In the lapping machine, the exposed major surface of the saw cut wafer is initially lapped by using a three micron platelet alumina, which is a "grit" of micronized unfused synthetic aluminum oxide, in which the individual particles have a uniform surface and a distinctive plate-like shape. The platelet alumina, or any other type of grit having a regular shaped surface to prevent scratching or fracture damage of the wafer, is used on a glass plate, fitted within the eccentric type lapping and polishing machine. The eccentric lapping motion prevents wafer damage which may result from use of a grinding wheel. The exposed surface of the saw cut wafer is lapped until the desired amount of surface material is removed. The amount of material lapped is established by the reference surface of the conditioning ring, and the known lapping rate established by the combination of the load on the wafer surface established by the weight of the jig fixture, the RPM of the machine, and the "grit" size, which provides an approximate lapping rate of 0.0002 inches/minute ($\simeq$5.0 microns/minute).

The exposed surface of the saw cut wafer is then polished in the eccentric lapping machine with a Politex Supreme pad saturated with a solution of 6 ml of 6% sodium hypochlorite in 100 ml of distilled water, to remove approximately 10 microns of the lapped wafer surface. The polishing is necessary to remove the damage to the wafer surface caused by the "grit" compound, which may extend into the wafer to a depth twice that of the grit diameter, and to produce a mirror like finish on the surface. The polishing rate is approximately 0.001 inch/hour ($\simeq$25 microns/hour).

After lapping and polishing, the saw cut wafer is removed from the stainless steel block. It is then scribed and cleaved into some number of 5.0 cm by 1.0 cm waveguide strips, the number being dependent on the wafer size. Each waveguide strip is attached to a copper block with vacuum grease, such as Apeizon type grease, with the polished major surface exposed. The copper block is mounted on a rotating substrate holder of an ion beam milling machine of the type known in the art, such as the Vecco Microetch System. The rotating holder is thermally connected with thermal grease to a water cooled copper fixture. The wafer is bonded with vacuum grease to the copper block which is mechanically mounted through a layer of thermal grease to the holder. The water cooled fixture maintains the wafer temperature at less than 50° C. to prevent thermal stress and distortion of the wafer due to temperature build up during the ion milling. The substrate holder rotates at a determined RPM and is oriented at a normal angle to the collimated beam of Ar+ions. The exposed polished major surface of the waveguide strip is ion milled at a current density of 1.0 milliamps/cm$^2$, resulting in a removal rate of 8 microns per hour. The ion milling is continued until approximately 25 microns of crystal material is removed.

At this point, the processing of the first major surface of the saw cut wafer is complete. In the fabrication of a desired thin-film membrane including the planar optical waveguide, 12 of FIG. 1, the semi-processed wafer is removed from the ion beam milling machine and remounted to the stainless steel block, by waxing the processed surface, and attached to the precision jig for processing the other major surface. However, for the fabrication of a planar optical waveguide for use within a broadband microwave waveguide modulator of the type disclosed in the second one of the two hereinbefore cross referenced, copending applications, a ground microwave electrode must be electroplated on the processed surface. In the intermediate electroplating step, the wafer is left in the ion beam milling machine after ion milling is complete, after which the substrate holder is reoriented to a position in which the ion milled surface is placed in direct view of a water cooled copper target, and a thin layer of copper film, on the order of one micron, is deposited on the ion milled surface. The copper coated waveguide wafer is then removed from the ion milling machine and electroplated in a manner known in the art such as a Sel Rex Cubath I process at a current density of 30 milliamps/cm$^2$, until a copper film having a thickness on the order of 10 microns is deposited on the copper coated surface of the waveguide wafer. The 10 micron copper film provides the ground plane of the waveguide. The waveguide wafer is then bonded through its 10 micron copper coating to an optically polished copper block with a low viscosity resin of a type known in the art, such as Stycast 1217 resin manufactured by Emerson and Cuming Inc. The low viscosity resin allows formation of a thin bonding layer between the copper film and the copper block surface, on the order of two microns thick. The thickness and uniformity of the thin bonding layer is provided with only a few drops of properly prepared resin applied to the ground plane, by subjecting the copper cladded waveguide surface and the optically polished block to a counter-weight system which provides a uniform distributed weight across the interface between the copper grounded electrode and the optically polished block. This completes the intermediate step of planar waveguide required in the microwave modulator of the referenced copending application.

The thinning process on the second major surface of the saw cut wafer requires the wafer, or the combination of the copper cladded waveguide wafer bonded to the copper block in the case of the waveguide modulator fabrication, to be again mounted in the precision polishing jig and parallel aligned with the three steel legs, as described in detail hereinbefore. After alignment, the jig is placed in the lapping machine and the second major surface is lapped to remove the required amount of crystal material, followed by chemo-mechanically polishing the surface to a mirror like finish, in accordance with the lapping and polishing process described hereinbefore.

During the lapping and polishing of the remaining major surface, the thickness of the waveguide crystal is measured at several points along the length of the wafer with an IR Spectrophotometer of the type known in the art, such as the Perkin-Elmer model 621 operated in the reflectance mode. The IR Spectrophotometer measures the thickness variation in the crystal material resulting from wedging of the material as a result of the lapping and polishing process. With the lapping and polishing process described, the wedging is typically found to be less than two microns along a 5.0 cm length of a 0.0055 inch thick waveguide wafer. The IR spectrophotometric measurements may be compared with the Hover probe measurements to determine whether any wedging has occurred in the copper ground plane or the optically polished copper block to which the waveguide is bonded. In general, there is good agreement between the two independent measurements which implies that that ground plane and copper block are essentially wedge free. For a desired planar waveguide thickness of 25 microns, the wafer is lapped to a thickness of approximately 0.0024 inches (61.0 microns), after which the chemo-mechanical polishing process is performed to remove approximately 10 microns of the crystal material, and provide the mirror like finish on the wafer which has a post polishing thickness on the order of 50 microns. As described hereinbefore, a 10 micron layer removal by polishing ensures that all surface damage caused by the "grit" compound is removed. This is necessary prior to ion beam milling, since the ion beam replicates the pre-ion milling surface profile. However, the polishing process causes some rounding in the wafer surface, such that the amount of material removed by polishing must be limited. The 10 micron value has been established as the optimum value.

With the thickness of the waveguide wafer on the order of 50 microns following polishing of the second major surface, the final thinning of the wafer down to a thickness of 25 microns is provided through a final ion beam milling process in the same ion beam milling apparatus described hereinbefore. Since the final ion milling process reduces the wafer down to the desired final thickness of 25 microns, the maintaining of the waveguide wafer temperature at less than 50° C. is even more important than in the ion milling of the first side where the wafer had a greater material thickness, since the difference in thermal expansion between the waveguide wafer and the electroplated copper ground plane may cause cleavage in the wafer. The water cooling fixture described hereinbefore is specially designed for the machine substrate holder to maintain the wafer temperature at less than 50° C. during the entire period of ion bombardment. In the final ion milling process, the current density of the collimated ion beam is on the order of 0.8 ma/cm$^2$ with the rotating substrate holder oriented at an angle of 45°, with respect to the collimated ion beam. Under these conditions, the removal rate is 8 microns per hour and the ion beam thinning is terminated when the crystal wafer thickness is reduced to the final desired thickness. This completes the basic fabrication process of the planar thin film, bonded down infrared waveguide, or of a thin-film membrane in general.

The mechanical thinning process described hereinbefore, including the coarse lapping, and fine polishing and ion beam milling to controlled removal rates and removal values, results in a high accuracy thin-film thickness value. The precise alignment procedure provided with the Hover probe ensures parallelism of the two major surfaces of the thin film membrane to provide a uniform processed wafer thickness to within one micron per square centimeter over the entire area of the thin film, which for the waveguide structure in on the order of 1 cm$\times$5 cm=5 cm$^2$. The use of the IR Spectrophotometer provides an accurate monitoring of thickness uniformity during the thinning process. The process is suitable for fabrication of thin film membranes for use in any application requiring such thickness accuracy, and thickness uniformity, and the process is not limited to fabrication of the optical waveguides alone.

Figure 9A:
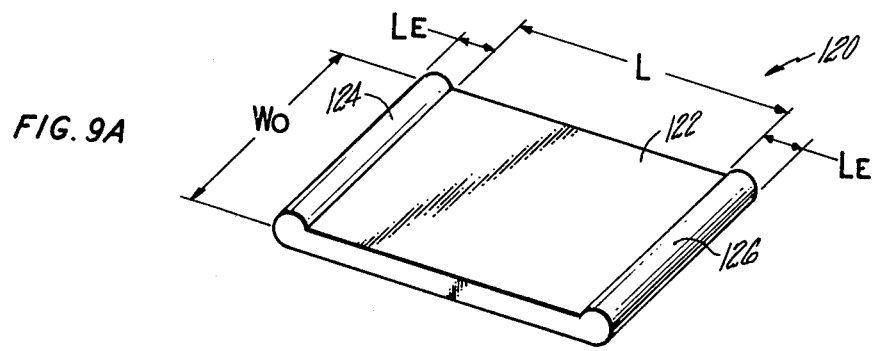
FIG. 9A is a perspective illustration of a mask used in the fabrication of the waveguide embodiment of FIG. 4 in accordance with the present invention.
Figure 9B:
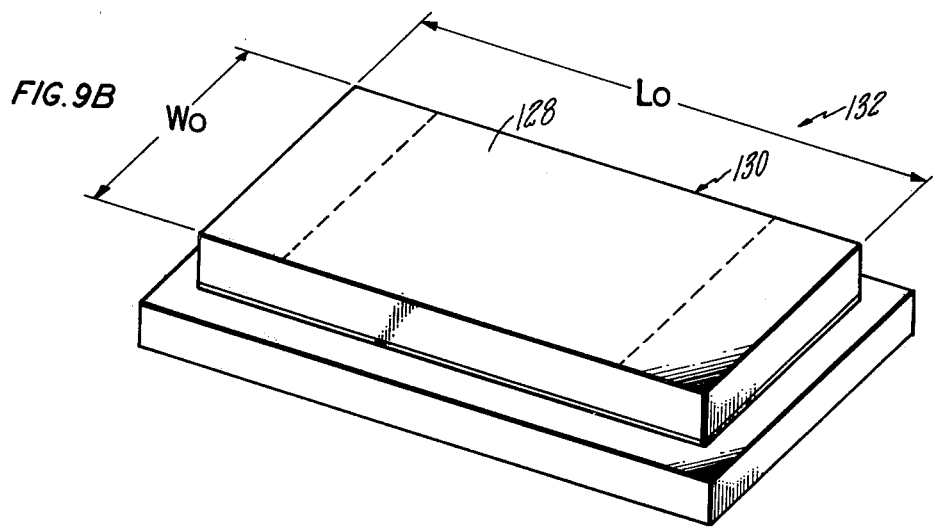
FIG. 9B is a perspective illustration of a planar waveguide structure used in the fabrication of the waveguide of FIG. 4 in accordance with the present invention.
Figure 9C:
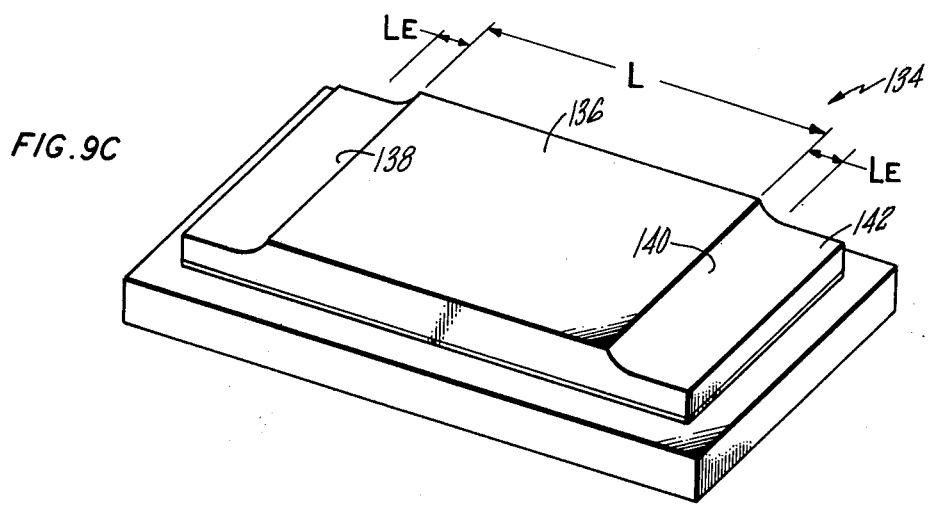
FIG. 9C is a perspective illustration of the waveguide structure of FIG. 4 provided in accordance with the fabrication process of the present invention.

With regard to the fabrication of the various monolithic thin film optical waveguide structures described hereinbefore, other than the planar waveguide, additional processing is required. Referring to FIGS. 9A, 9B and 9C, in the fabrication of the bi-level tapered waveguide structure, described hereinbefore with respect to FIG. 4, a completed process planar waveguide wafer is placed in the substrate holder of the ion beam milling machine. A shadow mask 120, shown in FIG. 9A, is centrally placed on the exposed polished surface of the planar waveguide and held in place by waxing the contact surface. The mask 120 is made of a material having a low ion milling rate, such as aluminum oxide or carbon, and is of a generally rectangular shape having a width $W_o$ equal to that of the waveguide and a length less than that of the waveguide. The mask has a planar central portion 122 having a length L equal to that of the desired length of the interaction region of the waveguide. The mask is flared at the ends 124, 126 into generally cylindrical contours having a determined diameter $L_E$. Referring to FIG. 9B the shadow mask 120 is placed in the central region 128 of the exposed polished surface 130 of the pre-final ion milled planar waveguide 132. For a 10.6 micron wavelength, $CO_2$ laser waveguide having a length ($L_o$) of 5 cm and a width ($W_o$) of 1.0 cm, the length and width of the shadow mask 120 is 2.77 cm and 0.8 cm respectively. With the shadow mask in place on the surface of the waveguide the exposed waveguide surface is ion milled at a current density of 0.6 ma/cm$^2$ with an ion beam angle of incidence normal to the surface of the waveguide. The ion milling rate is 6 microns per hour, and the waveguide surface is milled until approximately 12 microns of material are removed from the unmasked surface area. The result in the waveguide geometry shown in FIG. 9C where a bi-level, tapered waveguide 134 is provided with a raised plateau portion 136 which is tapered on each end 138, 140 to provide a piece-wise linear transition between the plateau and the remaining surface portion 142 of the guide. The taper length ($L_E$) is greater than 100 wavelengths of the laser intended for use in the waveguide. As may be obvious, the ion milling with the shadow mask may be shortened or extended to remove any determined amount of surface material, and produce any desired height differential between the plateau portion and the remaining surface portion.

Fabrication of the ridge and raised ridge waveguides described hereinbefore, which are used in phase modulator embodiments such as that described and claimed in the hereinbefore cross-referenced, copending application to a BROAD BAND MICROWAVE WAVEGUIDE MODULATOR FOR INFRARED LASERS, is provided through a further process of electroplating a microstrip electrode on the polished surface of the planar waveguide and tapered waveguide respectively, after final ion beam milling of each.

Figure 10A:
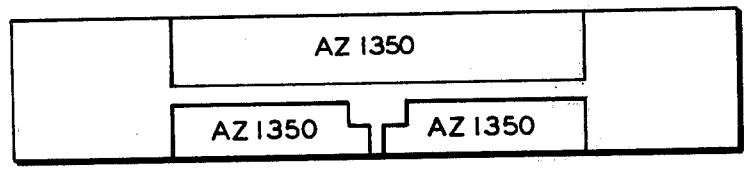
FIG. 10A is an illustration of a step of the fabrication process according to the present invention.
Figure 10B:
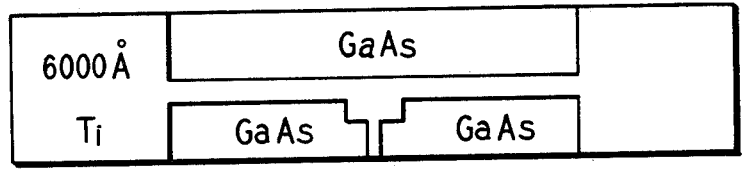
FIG. 10B is an illustration of another step of the fabrication process according to the present invention.

For fabrication of a ridge waveguide, or simple channel waveguide, a planar waveguide wafer is first spin coated with a photoresist coating, such as Shipley AZ 1350 B photoresist. The photoresist coating is exposed and developed in a center portion of the milled waveguide surface along a length L equal to that of the modulator interaction region. A one micron copper film is ion-plated onto the exposed and developed center portion of the waveguide surface. An overcoat of photoresist is then applied over the one micron copper film and a microstrip electrode pattern mask is placed on the copper film. The electrode pattern is exposed and developed, and the microstrip image is electroplated to a thickness of 11 microns in a copper electroplating bath. The remaining resist coating is removed, and the surface is covered with a ferric chloride solution which etches away a one micron layer of copper, resulting in the removal of the thin copper film entirely, leaving a microstrip electrode with a thickness of 10 microns. The ridge is than fabricated by again spin coating the waveguide surface with an AZ 1350 B photoresist coating and exposing and developing the pattern shown in FIG. 10A. The entire waveguide surface is then ion plated with 6,000 angstrons of titanium. The titanium plated photoresist is then lifted off in an acetone bath to expose the waveguide material surface in the proposed channel region, as shown by the pattern in FIG. 10B. The channel is then formed by ion beam milling the exposed waveguide surface with a collimated beam at a current density of 0.8 ma/cm$^2$ for a determined time interval with the ion beam normal to the surface of the waveguide. The time interval is dependent on the ion milling rate and the desired depth of the channel. The titanium coating has a high differential etch rate with respect to the waveguide material (10:1), such that it provides a milling mask which prevents the region of the waveguide surface covered by the titanium from being milled. The surface is ion milled until the determined depth is acehived, which is typically on the order of 4 to 6 microns. After the ion milling is completed, the remaining titanium coating is etched away in a hydroflouric acid bath without degrading the exposed waveguide crystal surface.

The raised ridge waveguide of FIG. 7 is fabricated in a similar manner from a fabricated bi-level tapered waveguide which includes the electroplated microstrip electrode disposed in the interaction region by the process described hereinbefore. A reversed photoresist is spin coated on the surface of the bi-level waveguide including the microstrip electrode, through a mask pattern which allows coating only of the surface area to be subjected to ion beam milling. A titanium thin film is then sputtered over the entire surface area of the waveguide. The titanium coated photoresist is lifted off from the waveguide in an acetone bath to expose the surface area to be milled, and the waveguide is ion beam milled to a desired depth. After milling the titanium mask is stripped with hydrofluoric acid.

In the process described hereinbefore, the wafer is scribed and cleaved into a number of rectangular waveguide strips following lapping, polishing and the ion-beam milling of the first surface. However, this step is related to the fabrication of waveguides and may be eliminated where a thin membrane is being made in accordance with the teachings of the present invention for purposes other than making of waveguides, which is simply an exemplary use of the process of the invention. Similarly, although the invention has been shown and described with respect to preferred embodiments thereof, it should be understood by those skilled in the art that the foregoing and various other changes, omissions and additions in the form and detail thereof may be made therein without departing from the spirit and the scope of the invention.

Having thus described typical embodiments of our invention, that which we claim as new and desire to secure by Letters Patent is:

1. In a method of manufacturing a thin-film membrane of a given material having parallel major surfaces separated by a thickness of uniformity of on the order of one micron per square centimeter therebetween, from a wafer thereof, the steps of:
    accurately positioning the wafer within a plane of lapping of a lapping machine;
    lapping the surface of the wafer with a grit of regular shaped abrading material having a given diameter to remove a desired amount of material from the wafer, said desired amount including at least enough so as to eliminate from the wafer discontinuities, irregularities, and damage extending inward from the original surface of the wafer;
    polishing the lapped major surface in an accentric lapping machine with an etching solution for the material of the wafer to a depth on the order of twice the diameter of the grit used in the lapping step;
    ion milling the polished major surface to remove on the order of twice the thickness of material removed in the polishing step;
    repeating the lapping and polishing steps on the other major surface of the wafer; and
    ion milling the second polished major surface to provide a thin-film membrane of desired thickness.

2. In a method according to claim 1, the additional steps, performed in conjunction with the steps of lapping and polishing the second major surface of the membrane, of measuring the thickness of the membrane as the processing proceeds at several points along said second surface.

3. In a method according to claim 1, the additional step, performed in conjunction with the ion-beam milling of said second major surface of measuring the thickness of said membrane and continuing the ion-beam milling until the thickness is a desired thickness for the membrane being formed.

4. In a method according to claim 1, wherein said step of accurately positioning the wafer within a plane of lapping, includes a further step of accurately positioning the plane of the wafer in parallel alignment with the plane of lapping of a lapping machine.

5. The method according to claim 1 wherein the step of lapping is performed with a grit having a diameter on the order of five microns.

6. In a method according to claim 1, the step, between the polishing step and the ion-beam milling step for each of said major surfaces, of bonding the wafer material with vacuum grease to a conductive block and mechanically mounting the conductive block to a water-cooled fixture holder with a layer of thermal grease.

7. In a method according to claim 6, the additional step of water cooling the fixture to which the wafer material is greased-mounted to maintain a temperature of not more than 50° C. to prevent thermal stress and distortion of the material during the ion-beam milling step.

* * * * *

UNITED STATES PATENT AND TRADEMARK OFFICE
CERTIFICATE OF CORRECTION

PATENT NO. : 4,169,009
DATED : September 25, 1979
INVENTOR(S) : Robert A. Wagner and Peter K. Cheo It is certified that error appears in the above-identified patent and that said Letters Patent are hereby corrected as shown below:

Column 1, line 19 "U.S. Pat. No." should be --U.S. Ser. No.--.

Column 1, line 41 "ar" should be --are--.

Column 5, line 25 "$\eta = \frac{2}{\alpha 1} (1 - e^{\alpha 1})^2,$" should be --$\eta = \frac{2}{\alpha \ell} (1 - e^{\alpha \ell})^2,$--.

Column 5, line 27 "1" should be --$\ell$--.

Column 5, line 32 "1 = 1" should be --$\ell$ = 1--.

Column 7, line 9 "1" should be --$\ell$--.

Column 16, line 40 "accentric" should be --eccentric--.

Signed and Sealed this

Thirtieth Day of December 1980

[SEAL]

Attest:

SIDNEY A. DIAMOND

Attesting Officer

Commissioner of Patents and Trademarks